US005235469A

United States Patent [19]
Horian

[11] Patent Number: 5,235,469
[45] Date of Patent: Aug. 10, 1993

[54] SIDE VIEW MIRROR

[76] Inventor: Richard C. Horian, 555 Esplanade Ave., #517, Redondo Beach, Calif. 90277

[21] Appl. No.: 693,966

[22] Filed: Apr. 29, 1991

[51] Int. Cl.$^5$ .......................... G02B 5/08; G02B 7/18; B60R 1/02
[52] U.S. Cl. .................................. 359/851; 359/871; 359/872
[58] Field of Search ............... 350/612, 613, 626, 627, 350/631; 359/838, 850, 851, 865, 866, 871, 872, 602, 603, 604, 605, 606

[56] References Cited

U.S. PATENT DOCUMENTS

| | | | |
|---|---|---|---|
| 1,567,169 | 12/1925 | Patterson | 359/871 |
| 2,573,812 | 11/1951 | Schroeder | 350/613 |
| 3,806,232 | 4/1974 | Gray | 359/851 |
| 4,750,825 | 6/1988 | Blom | 359/866 |
| 4,989,964 | 2/1991 | Meise | 359/851 |
| 5,054,900 | 10/1991 | Simson | 359/851 |
| 5,113,292 | 5/1992 | Simson | 359/872 |

FOREIGN PATENT DOCUMENTS

| | | | |
|---|---|---|---|
| 2550095 | 5/1976 | Fed. Rep. of Germany | 350/613 |
| 2601911 | 7/1977 | Fed. Rep. of Germany | 350/612 |
| 3243178 | 5/1984 | Fed. Rep. of Germany | 350/612 |
| 3624321 | 2/1988 | Fed. Rep. of Germany | 359/838 |
| 0507147 | 3/1956 | Italy | 350/631 |
| 1040148 | 8/1966 | United Kingdom | 350/613 |

*Primary Examiner*—Bruce Y. Arnold
*Assistant Examiner*—R. D. Shafer
*Attorney, Agent, or Firm*—Lyon & Lyon

[57] ABSTRACT

A horizontal cut stepped mirror mounted to the pillars of an automobile to either side of the windscreen. Such mirrors may be mounted for adjustment or affixed directly to the pillar. Cushioning and mechanical adjustments may be used in mounting to the pillar for safety. The mirrors can be mounted inwardly and/or outwardly of the side window.

27 Claims, 3 Drawing Sheets

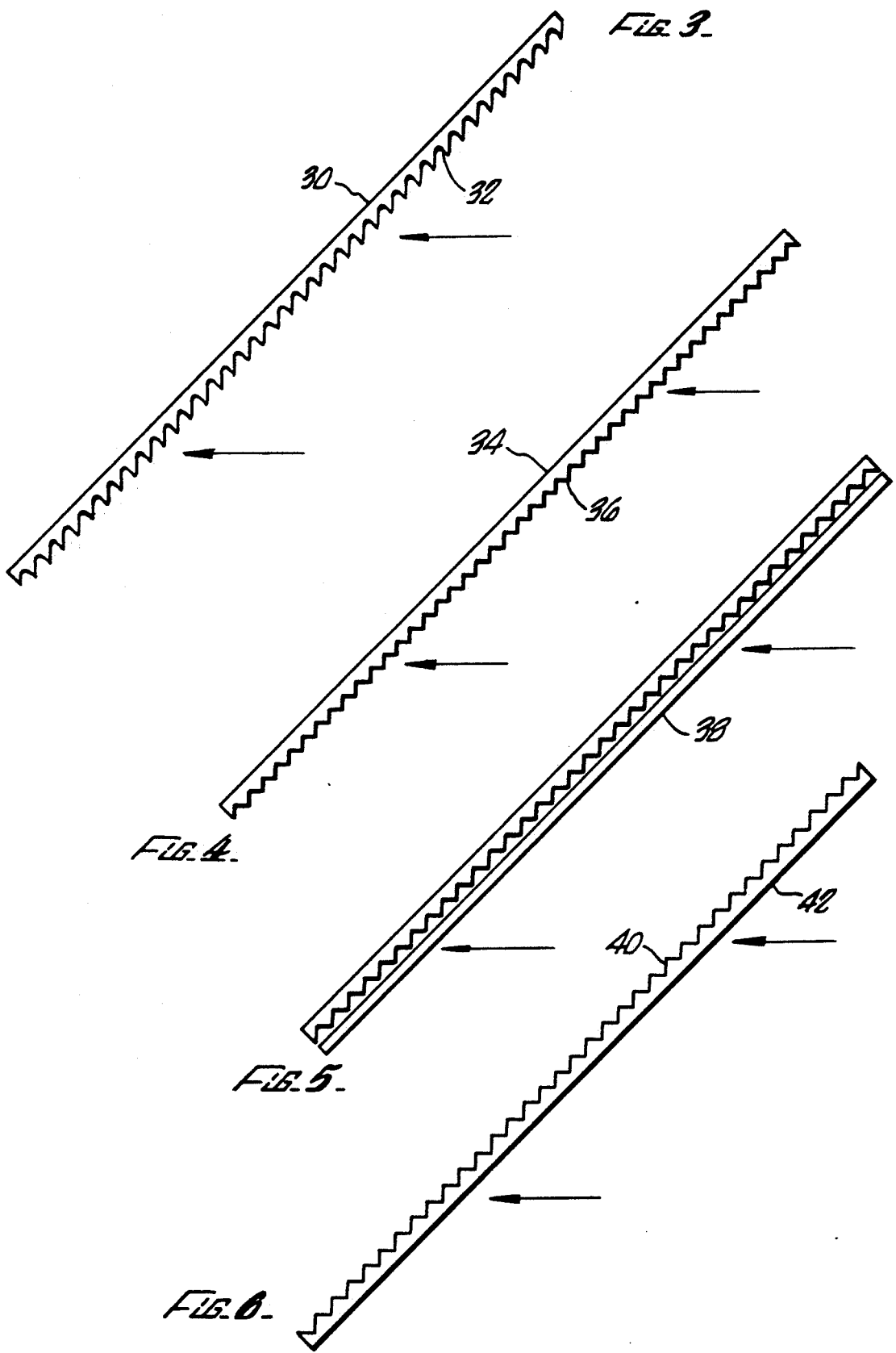

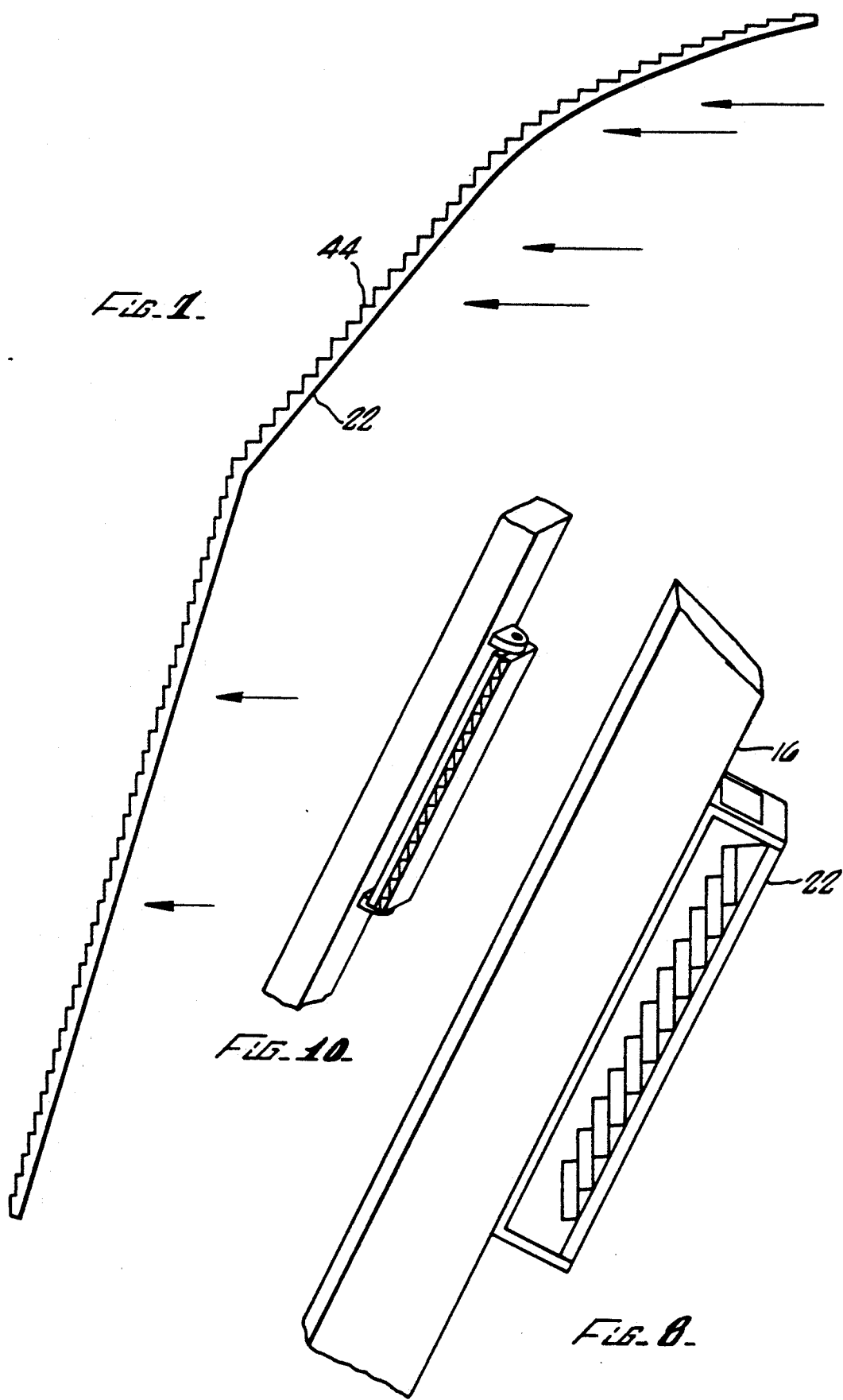

SIDE VIEW MIRROR

BACKGROUND OF THE INVENTION

The field of the present invention is mirrors associated with vehicles for side viewing.

For many years vehicles have employed plane surface mirrors bolted or otherwise affixed to the exterior of the body or to the windscreen pillar adjacent to the driver position for side viewing. Such mirrors have actually changed little over the past 100 years. Aside from changing the profile and adding heaters, remote operation and the like, the plane surface mirror continues to simply protrude from the side of the vehicle.

It is understood that a substantial number of people believed to number in the hundreds are killed or injured each year by impact with such exterior mounted mirrors on both moving and stationary vehicles. An unknown number of accidents also are understood to occur because of the limited viewing capacity provided by such mirrors.

Side view mirrors are also disadvantageous in the amount of aerodynamic drag attributed to these devices. In part because of the lost fuel economy, car manufacturers use side view mirrors today which are much smaller than those employed on far older vehicles.

Attempts have been made to improve the efficiency of vehicle mirrors. Mirrors having vertical divisions to allow different or progressively altered views have been developed. However, these mirrors tend to be excessively large, take up excessive room in the vehicle and/or obscure additional view. Perception problems particularly at night, with multi-directional mirrors can also result. Consequently, no fully satisfactory solution has been forthcoming in the provision of full rear and side viewing in vehicles.

SUMMARY OF THE INVENTION

The present invention is directed to horizontal cut, stepped mirrors used on or near one or both of the side pillars of a windscreen on a vehicle. The stepped mirror is arranged to act as a side view mirror giving a side view image. The pillars associated with the sides of the windscreen on a vehicle are generally mounted inclined to the vertical to frame the front windshield and support the roof. These pillars are necessary but obstruct the view of the driver. Adding such mirrors to the pillars can provide side views and use of pillar area as a useful side viewing area. This advantageous use of the pillar area is realized even though it may be desired to extend the mirror beyond the pillar as well in certain applications.

By being located on the pillars, the mirrors may be designed so as not to stick outwardly from the vehicle to pose a danger to others and create aerodynamic drag. Even if located on the exterior of the vehicle, aerodynamic drag is reduced by the stepped design following the angular contour of the pillars. If located on the pillars in the interior of the vehicle, further advantage may be obtained with the mirrors being protected from the exterior environment. A combination of exterior and interior mounting can also allow design configurations to match the vehicle design.

Accordingly, it is an object of the present invention to provide a vehicle having an improved side view mirror system. Other and further objects and advantages will appear hereinafter.

BRIEF DESCRIPTION OF THE DRAWINGS

FIG. 3 is an edge view of a mirror of the present invention.

FIG. 4 is an edge view of a second mirror of the present invention.

FIG. 5 is an edge view of a third mirror of the present invention.

FIG. 6 is an edge view of a fourth mirror of the present invention.

FIG. 7 is an edge view of a fifth mirror of the present invention.

FIG. 8 is a side view of a mirror of the present invention having a cushioned mounting.

FIG. 10 is a side view of a mirror of the present invention having a mechanical adjustment.

DETAILED DESCRIPTION OF THE PREFERRED EMBODIMENT

Figure 1:
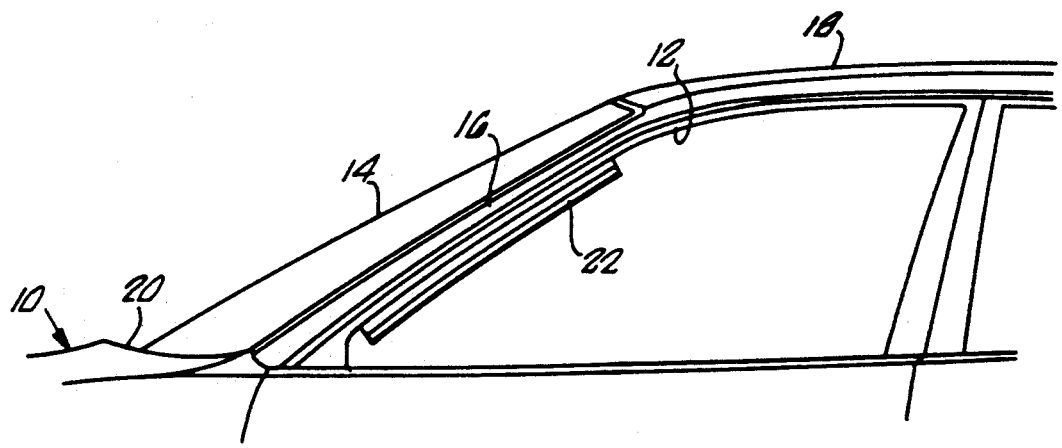
FIG. 1 is a side view of a vehicle post with a mirror of the present invention.

Turning in detail to the drawings, FIG. 1 illustrates a portion of a vehicle 10. Specifically, the driver side window 12 of an automobile is illustrated with a front windscreen 14 and a pillar 16 located at one end of the windscreen 14 and also defining the forward end of the window 12. This pillar is known in the automobile industry as an "A pillar". The A pillars 16 are typically steel posts that support the roof 18 on the vehicle body 20. The pillars 16 are necessary for protection and support but they interfere with the driver's view, creating what is known as a "blind spot". Typically A pillars 16 are inclined to the vertical. Most frequently they are tilted rearwardly and slightly inwardly.

Mounted at the A pillars 16 are mirrors 22. The mirrors 22 are stepped mirrors of any one of a plurality of designs as can be seen in FIGS. 3 through 8. The steps are positioned generally horizontal and are arranged to provide a side view image to the driver position from either the left or right side of the vehicle. The configuration of the stepped mirrors 22, therefore, preferably matches the inclination of a particular A pillar 16. The mirrors 22 are also configured in shape to utilize the area of a specific A pillar so as not to measurably increase the blind spot and yet provide as much side viewing area as possible. To this end, the mirrors 22 may extend for the entire length of the A pillar 16 as well as extend across its entire width. Thus, the mirror may be 20 inches or more in length and 1¼ to 5¼ inches in width. A mirror extending the full height of the A pillar has the advantage of viewing a much larger vertical area. Under such conditions, blocking of the view by a single vehicle is unlikely.

The mirrors 22 may be mounted to the A pillars in a number of ways. They may be inwardly and/or outwardly of the side window. Additionally, they may be adjustably mounted through conventional pivot elements 23 or the like. In the event that pivot, pan or tilt elements are included such as in FIG. 10, the stepped mirrors may be mounted to the pillars in a housing 25 to include room for these adjustment element mechanisms. The housing 25 containing the mirror would be directly mounted to the "A pillar" so as to require very little additional space. Such mounting may allow for adjustment based on drive position and driver height. As illustrated in FIG. 8, resilient material 24 may be employed to back the mirrors 22 within a housing 25. Thus, a cushioning effect would be experienced if impacted during an accident.

Figure 2:
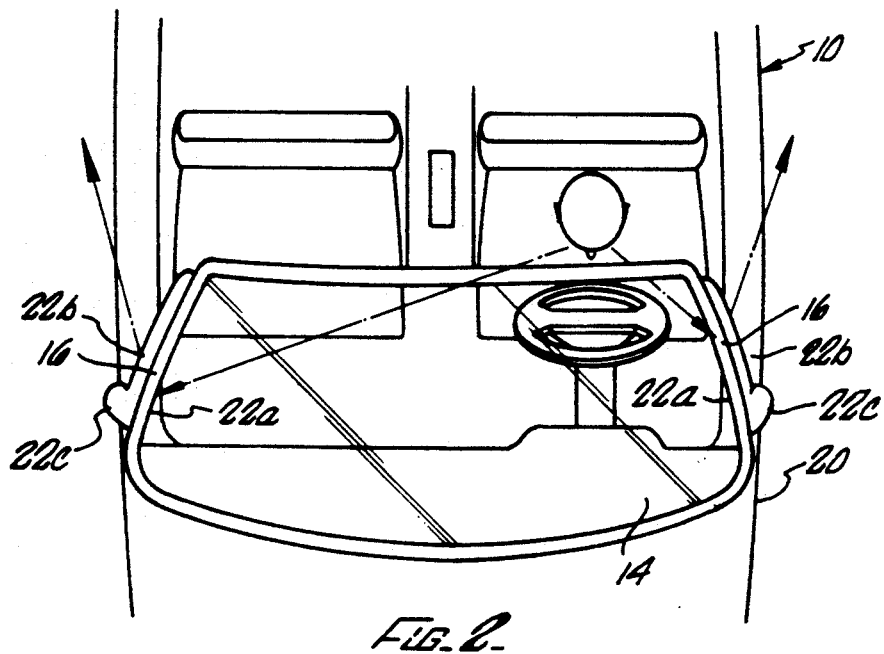
FIG. 2 is a plan view of a portion of a vehicle with mirrors of the present invention.

The stepped mirrors 22 may include specific locations and configurations to utilize the areas of the pillars and provide specific views. FIG. 2 illustrates one such configuration. A stepped mirror 22a is located on the pillar inside the vehicle. Another such mirror 22b is located on the outside of the vehicle. The outside mirror 22b may also include an extension 22c which provides a more conventional rear view. This extension 22c may be planar or stepped. The close association of the mirror 22b and the extension 22c assist in reduction of aerodynamic drag depending on the degree of extension in conjunction with pillar design.

Figure 9:
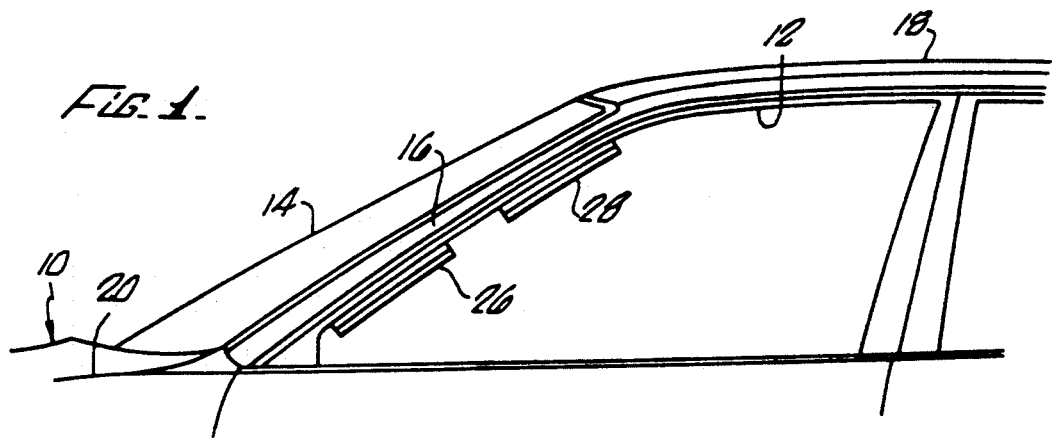
FIG. 9 is a series of mirrors of the present invention mounted above one another.

The vertical extent of the mirror 22 may also be divided into a plurality of mirrors 26 and 28 one above the other as seen in FIG. 9. These mirrors may be independently adjusted. Because of the differing images provided by multiple mirrors, a one-inch gap between each mirror is recommended to avoid driver confusion, particularly at night. One arrangement might include three mirrors which are 3"×6" with one inch in between each adjacent pair to fit along a 20" pillar.

The mirrors 22 are arranged to use the blind spot of the diagonally mounted A pillar for practical side view viewing. In addition, everything that is commonly employed with conventional side view mirrors may be incorporated into the mirrors 22, e.g., manual or electrical adjustment, heating, tinting, glare absorption, controlled distortion such as convex, concave and spherical, prismatic day/night viewing, light-sensitive photo optic shading, safety lamination, surface coatings and the like.

The composition of the mirror may take on several forms. Injection molding is a convenient process by which the mirror surfaces can be manufactured. Relatively thin films may be used with theoretically possible thicknesses down to 0.005 inches. With an appropriately configured pillar for purpose of mounting such mirrors, thin-film mirrors 22 may be directly applied with adhesive to the pillar. Various flexible films or rigid mirror structures for different driver heights may be available. Alternatively, a mounting structure may support the flexible or rigid mirror which is in turn adjustably associated with the pillar. Looking specifically to the various mirror details, FIG. 3 illustrates a stepped mirrors with undercut portions 32 to prevent potential glare from the undersurface. FIG. 4 illustrates a mirror 34 having the steps 36 on the front surface. This avoids glare from a coating or glazing on the front of the mirror. Spot coatings or glazing may be added to the front and or rear portions of the mirror to aid in achieving the preferred optics. FIG. 5 illustrates a construction like FIG. 4 but adds a coating or glazing 38 if it becomes preferred to have a smooth and protective surface. The mirrors may be metalized or "silvered" on the front surface, the rear surface or the center laminate or may be spot surface coated depending on the mirror construction. FIG. 6 provides steps 40 on the rear surface with a coating 42 for a smooth, protected front surface. FIG. 7 illustrates one form of the mirror construction 22 where the steps 44 differ depending on the inclination of various portions of the A pillar 16.

In making the mirrors 22, conventional construction and conventional materials may be appropriately employed. Glass, plastic, films, metals and composites are available. The steps may be to any practical scale. The length, depth and overall size of each step may be configured to any size to accommodate design parameters of straight, curved or angled sections while still providing essentially horizontal viewing. The steps may be 0.003" to 0.375" in length and/or depth. The outer mirror shape may be any design to accommodate vehicle and viewing requirements.

A myriad of techniques may be employed each with its advantages and disadvantages known to manufacturers. The current construction technologies include injection molding, spin casting, vacuum forming, reaction injection molding, pressure forming, coining, stamping, machining, optical grading, micropolishing, laser cutting, chemical etching, sandblasting, electrical discharge machining, plating, vacuum metalizing, extruding, diamond machining and electroplating.

Thus, a side view mirror system has been disclosed which eliminates the existing dangerous and inefficient side view mirror design without decreasing the ability for side viewing and without significantly intruding into the interior space and clear viewing of the operator. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is;

1. A vehicle having a windscreen and a driver position behind the windscreen, comprising
   a pillar inclined to the vertical and at one end of the windscreen;
   a stepped mirror mounted proximate to said pillar with said steps extending horizontally, said mirror being constructed and arranged to provide a true side view image to the driver position.

2. The vehicle of claim 1 wherein said mirror extends substantially the length and width of said pillar.

3. The vehicle of claim 1 wherein said mirror follows the contour of said pillar.

4. The vehicle of claim 1 wherein said steps are reflective of the angle of inclination of said mirror to the vertical.

5. The vehicle of claim 1 further comprising a second pillar at a second end of the windscreen and a second stepped mirror mounted proximate to said second pillar with said steps extending horizontally, said second mirror being constructed and arranged to provide a true side view image to the driver position.

6. The vehicle of claim 5 wherein said second stepped mirror is mounted to said second pillar.

7. The vehicle of claim 1 further comprising a plurality of said mirror, said mirrors being mounted proximate to said pillar above one another.

8. The vehicle of claim 1 wherein said pillar is adjacent the driver position.

9. The vehicle of claim 1 wherein said pillar is that most displaced from the driver position.

10. The vehicle of claim 1 further comprising a housing, said mirror being mounted in said housing.

11. The vehicle of claim 10 wherein said housing includes impact absorbing material to which said mirror is mounted.

12. The vehicle of claim 1 wherein said mirror is positioned inwardly of the vehicle.

13. The vehicle of claim 1 wherein said mirror is positioned outwardly of the vehicle.

14. The vehicle of claim 1 wherein said mirror includes a first portion and a second portion, said first portion being position proximate to said pillar inwardly of the vehicle and said second portion being positioned proximate to said pillar outwardly of the vehicle.

15. The vehicle of claim 1 wherein said mirror is positioned on a said pillar outwardly of the vehicle and includes an outwardly extending portion for additional viewing.

16. The mirror of claim 1 wherein said stepped mirror is mounted to said pillar.

17. A mirror for a vehicle having a windscreen and a driver position behind the windscreen, the windscreen, including a pillar inclined to the vertical and at one of the windscreen adjacent the driver position, comprising
a stepped mirror mounted proximate to the pillar with said steps extending horizontally, said mirror being constructed and arranged to provide a true side view image to the driver position.

18. The mirror of claim 17 wherein said steps reflective of the angle of inclination of the pillar to the vertical.

19. The mirror of claim 17 further comprising a housing, said mirror being mounted in said housing.

20. The mirror of claim 19 wherein said housing includes impact absorbing material to which said mirror is mounted.

21. The mirror of claim 19 wherein said housing includes a mechanical adjustment mechanism for adjusting the view of said mirror.

22. The mirror of claim 17 wherein said stepped mirror is mounted to the pillar.

23. A vehicle having a windscreen and a driver position behind the windscreen, comprising
a pillar inclined to the vertical and at one end of the windscreen;
a door having a window frame with a portion of said window frame adjacent said pillar;
a stepped mirror mounted proximate to said pillar with said steps extending horizontally, said mirror being constructed and arranged to provide a true side view image to the driver position.

24. The vehicle of claim 23 wherein said stepped mirror is mounted to said pillar.

25. A mirror for a vehicle having a windscreen and a driver position behind the windscreen, the windscreen including pillars inclined to the vertical at each end of the windscreen, comprising
a stepped mirror mounted proximate to and inclined with one of the pillars with said steps extending horizontally and having reflective surfaces extending substantially vertically.

26. The mirror of claim 24 includes steps of approximately 0.003 inches.

27. The mirror of claim 25 including steps of between 0.003 inches and 0.375 inches.

* * * * *

UNITED STATES PATENT AND TRADEMARK OFFICE
CERTIFICATE OF CORRECTION

PATENT NO. : 5,235,469
DATED : August 10, 1993
INVENTOR(S) : HORIAN, Richard C.

It is certified that error appears in the above-identified patent and that said Letters Patent is hereby corrected as shown below:

In claim 18 (col. 5, l. 24), after "steps" insert -- are --.

In claim 26 (col. 6, l. 29) delete "24" and insert therefor -- 25 --.

Signed and Sealed this

Fifth Day of April, 1994

Attest:

BRUCE LEHMAN

Attesting Officer    Commissioner of Patents and Trademarks